US 6,732,830 B2

(12) United States Patent
Gagnon et al.

(10) Patent No.: US 6,732,830 B2
(45) Date of Patent: *May 11, 2004

(54) ALL TERRAIN VEHICLE

(75) Inventors: Claude Gagnon, Magog (CA); Paul Deutschman, Westmount (CA); John F. Gale, Deauville (CA)

(73) Assignee: Bombardier Recreational Products Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/095,064

(22) Filed: Mar. 12, 2002

(65) Prior Publication Data

US 2002/0088661 A1 Jul. 11, 2002

Related U.S. Application Data

(63) Continuation of application No. 09/057,652, filed on Apr. 9, 1998, now Pat. No. 6,523,634.

(30) Foreign Application Priority Data

Apr. 10, 1997 (CA) ............................................. 2202330

(51) Int. Cl.$^7$ ............................................... B60K 17/34
(52) U.S. Cl. ..................... 180/291; 180/215; 180/374; 180/908
(58) Field of Search ................................. 180/233, 227, 180/230, 231, 241, 251, 210, 212, 215, 217, 219, 291, 292, 357, 374, 376, 908

(56) References Cited

U.S. PATENT DOCUMENTS

| 3,662,849 A | | 5/1972 | Bostad et al. |
| 3,893,533 A | * | 7/1975 | Tidwell |
| 4,300,649 A | | 11/1981 | Sakata |
| 4,535,866 A | | 8/1985 | Shiga |

(List continued on next page.)

FOREIGN PATENT DOCUMENTS

| CA | 2149732 | 12/1995 |
| CA | 2150191 | 1/1996 |
| CA | 2153721 | 1/1996 |

Primary Examiner—Anne Marie Boehler
(74) Attorney, Agent, or Firm—BRP Legal Services

(57) ABSTRACT

Various embodiments of a saddle type vehicle are described. Configurations are shown in which the engine is located more towards the rear of the vehicle and in which the fuel tank extends generally vertically beneath the steering member. A radiator may also be located at a rear portion of the vehicle, rearwardly of the engine. A front storage compartment is also provided in the front portion of the vehicle. The resulting vehicle has improved access and storage capabilities and also has a lower center of gravity.

9 Claims, 11 Drawing Sheets

U.S. PATENT DOCUMENTS

| | | |
|---|---|---|
| 4,596,301 A | 6/1986 | Nagashima |
| 4,650,210 A | 3/1987 | Hirose et al. |
| 4,666,015 A | 5/1987 | Matsuda et al. |
| 4,699,234 A | 10/1987 | Shinozaki et al. |
| 4,714,126 A | 12/1987 | Shinozaki et al. |
| 4,744,432 A | 5/1988 | Shibata et al. |
| 4,757,872 A | 7/1988 | Inomata |
| D297,132 S | 8/1988 | Ryuzoji et al. |
| 4,770,262 A | 9/1988 | Yasunaga et al. |
| D298,113 S | 10/1988 | Tamura et al. |
| 4,779,697 A | 10/1988 | Takahashi |
| D298,811 S | 12/1988 | Morita |
| D299,324 S | 1/1989 | Oba et al. |
| 4,798,400 A | 1/1989 | Kosuge |
| 4,836,324 A | 6/1989 | Morita et al. |
| D305,999 S | 2/1990 | Ueda et al. |
| 5,076,387 A | 12/1991 | Oka |
| 5,078,223 A | 1/1992 | Ishiwatari et al. |
| D327,457 S | 6/1992 | Saito |
| D330,694 S | 11/1992 | Kimura et al. |
| 5,183,130 A | 2/1993 | Nakamura et al. |
| 5,327,989 A | 7/1994 | Furuhashi et al. |
| 5,347,799 A | 9/1994 | Hosaka et al. |
| 5,394,949 A | 3/1995 | Wright et al. |
| 5,515,940 A | 5/1996 | Shichinohe et al. |
| 5,558,059 A | 9/1996 | Yoshinaga et al. |
| 5,573,162 A | 11/1996 | Spencer et al. |
| 5,740,878 A | 4/1998 | Sala |

\* cited by examiner

ALL TERRAIN VEHICLE

This application is a continuation application of U.S. application Ser. No. 09/057,652 now U.S. Pat. No. 6,523,634, entitled "ALL TERRAIN VEHICLE", which was filed on Apr. 9, 1998 and is incorporated herein by reference in its entirety.

FIELD OF THE INVENTION

The present invention relates to the field of all terrain vehicles. More particularly, the invention relates to a saddle type vehicle comprising improved features.

BACKGROUND TO THE INVENTION

During the last decade or so, the popularity of all terrain vehicles (also referred to as "ATV's") has greatly increased. These types of vehicles are indeed very practical and versatile as they may be used for work or leisure related tasks. By virtue of their relatively compact nature, their great mobility and traction, they are capable of circulating in all sorts of surfaces, from the common back yard to the more challenging wood trail. Since they are also fairly powerful, all terrain vehicles are also used to pull or push various objects such as a trailer or a snow-plow.

Initially, these types of vehicle comprised a steerable front wheel and two driving rear wheels connected to an engine. Such three-wheeled vehicles were however very unstable and had a tendency to overturn and cause serious injuries, if not death, to the user. In order to increase stability, the three-wheel base was therefore changed to a four-wheel base.

FIG. 1 illustrates an embodiment of a saddle-type vehicle typically found in the prior art. Such a vehicle comprises four wheels mounted to a frame, the front ones being steerable. A fuel tank and a seat are disposed on an upper portion of the frame. The engine, which represents one of the heaviest components of the vehicle, is typically mounted in a central portion of the vehicle, usually below the fuel tank and a front portion of the seat. The engine location is specifically chosen to ensure a proper weight distribution. If the engine is water cooled, a radiator will be provided in front of the engine. Examples of such vehicles are described in more details in U.S. Pat. No. 4,757,872, issued on Jul. 19, 1988 and naming Inomata as inventor and in U.S. Pat. No. 5,515,940, issued on May 14, 1996 and naming Shichinohe et al. as inventors.

While such a configuration provides vehicles with performance levels that are more than adequate, there are nonetheless many disadvantages associated with it.

In order to sit properly and drive astride, the user must "mount" the vehicle, i.e. he or she must raise one leg over the fuel tank, seat or rear portion of the vehicle in order to sit on or get off the vehicle. Thus, one of the main disadvantages is that access to and from the vehicle can be somewhat challenging. Because of this, some persons tend to drive while assuming a "side-saddle" position and changing gears using a rope tied to the gear lever. This is impractical.

Another inconvenience associated with the location of the fuel tank is that it renders engine access more difficult since there is little space between the cylinder head of the engine and the tank. This is impractical during repair since the fuel tank must be removed. Since the fuel tank is also a relatively heavy component and since it is located on the upper portion of the frame, the above-mentioned configuration also has the disadvantage of creating a relatively high center of gravity.

The location of the radiator in front of the engine also has various disadvantages. Since, during normal use, the vehicle travels mostly in the forward direction, the front-located radiator is more exposed to the possibility of being pierced by a branch or the like or being obstructed by mud. In order to compensate for this, it may be possible to cover the radiator with a protective member but this reduces the amount of air reaching the radiator thereby reducing its cooling efficiency. This location of the radiator is also an ineffective use of valuable space.

The configuration referred to above also leaves very little room to accommodate storage compartments or additional accessories, especially in the front portion of the vehicle.

OBJECTS AND SUMMARY OF THE INVENTION

It is therefore an object of the present invention to provide a saddle-type vehicle having an improved frame and improved access features.

It is a further object of the present invention to provide a saddle-type vehicle having a relatively lower center of gravity.

It is yet another object of the present invention to provide a vehicle having improved storage capabilities.

As embodied and broadly described herein, the invention provides a saddle-type vehicle comprising a frame, a pair of front wheels suspended from a front portion of the frame, a pair of rear wheels suspended from a rear portion of the frame, a power unit mounted on the frame, a transmission allowing the power unit to transmit power to either one of the front or rear pairs of wheels, a seat located in between the front and rear pairs of wheels, wherein a main portion of the power unit is disposed beneath the seat.

In a preferred embodiment, a main portion of the transmission is also disposed beneath the seat and the power unit comprises a crankshaft and a transmission shaft extending in a running direction of the vehicle, and a rear drive shaft is connected to a rear end of the transmission shaft on one end and to a rear differential on the other end to allow the power unit to transmit power to the pair of rear wheels.

In the context of the present specification, the term "differential" should be interpreted as meaning any types of device that is capable of imparting a rotational movement to a pair of wheels from a driving shaft, whether or not it permits one wheel to revolve faster than the other one. This includes any type of gearing such as ring and pinion gearing, spiral gearing, hypoid gearing, worm gearing or the like. This also includes any types of viscous coupling.

In another preferred embodiment, the vehicle comprises a front drive shaft connected to a front end of the transmission shaft on one end and to a front differential on the other end to allow the power unit to transmit power to the pair of front wheels.

In another embodiment, the power is transmitted to either one of the front or rear pairs of wheels through a drive chain and sprocket arrangement.

In a preferred variant, the seat is pivotal connected to the frame, the seat being moveable between a first position whereby the driver may drive the vehicle and a second position whereby the driver may access the power unit. The seat preferably comprises a pommel located at a front portion thereof and is most preferably removably connected to the frame.

As embodied and broadly described herein, the invention also provides a saddle-type vehicle comprising a frame, a pair of front wheels comprising first and second wheels suspended from a front portion of the frame, a pair of rear wheels comprising third and fourth wheels suspended from a rear portion of the frame, the first and second wheels defining a first transversal axis and the third and fourth wheels defining a second transversal axis, a power unit mounted on the frame, a transmission allowing the power unit to transmit power to either one of the front or rear pairs of wheels, a seat located in between the front and rear pairs of wheels, wherein a main portion of the power unit is located between the second transversal axis and an imaginary axis located at a median point between the first and second transversal axis.

In a preferred embodiment, the power unit comprises a crankshaft and a transmission shaft extending in a running direction of the vehicle, and wherein a rear drive shaft is connected to a rear end of the transmission shaft on one end and to a rear differential on the other end to allow the power unit to transmit power to the pair of rear wheels. Most preferably, the vehicle also comprises a front drive shaft connected to a front end of the transmission shaft on one end and to a front differential on the other end to allow the power unit to transmit power to the pair of front wheels.

In yet another aspect, the invention provides a saddle-type vehicle comprising a frame, a pair of front wheels suspended from a front portion of the frame, a pair of rear wheels suspended from a rear portion of the frame, a power unit mounted on the frame, a fuel tank, a transmission allowing the power unit to transmit power to either one of the front or rear pairs of wheels, a seat located in between the front and rear pairs of wheels, wherein a main portion of the fuel tank is disposed substantially below the horizontal plane defined by the uppermost portion of the seat. Preferably a main portion of the power unit and of the transmission are disposed beneath the seat.

As embodied and broadly described herein, the invention further provides a saddle-type vehicle comprising a frame, a pair of front wheels suspended from a front portion of the frame, a pair of rear wheels suspended from a rear portion of the frame, a steering member connected to a steering mechanism for steering the front wheels, a power unit mounted on the frame, a fuel tank, a transmission allowing the power unit to transmit power to either one of the front or rear pairs of wheels, a seat located in between the front and rear pairs of wheels, wherein a main portion of the fuel tank is located beneath the steering member. Preferably, a main portion of the fuel tank is also disposed substantially below the horizontal plane defined by the uppermost portion of said seat and is disposed vertically.

In a further aspect, the invention also provides a saddle-type vehicle comprising a frame, a pair of front wheels suspended from a front portion of the frame, a pair of rear wheels suspended from a rear portion of the frame, a steering member connected to a steering mechanism for steering the front wheels, a seat located in between the front and rear pairs of wheels, a power unit mounted on the frame and having a main portion thereof being disposed beneath the seat, a fuel tank located beneath the steering member, a transmission allowing the power unit to transmit power to either one of the front or rear pairs of wheels, the vehicle further comprising an open area located between the fuel tank and the power unit, the open area providing easier access to and from the vehicle. The vehicle may comprise an additional storage container removably secured in the open area and the additional storage container may be an additional fuel tank.

As embodied and broadly described herein, the invention provides a saddle-type vehicle comprising a frame, a pair of front wheels comprising first and second wheels suspended from a front portion of the frame, a pair of rear wheels comprising third and fourth wheels suspended from a rear portion of the frame, a water cooled engine mounted on the frame, a transmission allowing the engine to transmit power to either one of the front or rear pairs of wheels, a seat located in between the front and rear pairs of wheels, the vehicle further comprising a radiator located at the rear portion of the frame.

Preferably, the radiator is located between the third and fourth wheels, behind the seat and is angled generally toward the seat.

In a preferred embodiment, the radiator further comprises a cooling fan disposed behind the radiator and the vehicle also comprises a ventilation opening for conveying cooling air to the radiator. Most preferably, the vehicle comprises at least two ventilation openings located above the third and fourth wheels respectively.

In another aspect of this invention, there is provided a saddle-type vehicle comprising a frame, a pair of front wheels suspended from a front portion of the frame, a pair of rear wheels suspended from a rear portion of the frame, a steering member connected to a steering mechanism for steering the front wheels, a seat located in between the front and rear pairs of wheels, a power unit mounted on the frame, a fuel tank, a transmission allowing the power unit to transmit power to either one of the front or rear pairs of wheels, the vehicle further comprising a storage compartment located forward of the steering member.

The invention also provides a saddle-type vehicle comprising a frame, a pair of front wheels suspended from a front portion of the frame, a pair of rear wheels suspended from a rear portion of the frame, a steering member connected to a steering mechanism for steering the front wheels, a seat located in between the front and rear pairs of wheels, a power unit mounted on the frame and having a main portion thereof being disposed beneath the seat, a fuel tank located beneath the steering member, a transmission allowing the power unit to transmit power to either one of the front or rear pairs of wheels, the vehicle further comprising an open area located between the fuel tank and the power unit, the open area providing easier access to and from the vehicle, the vehicle further comprising a storage compartment located forward of the steering member.

The saddle-type vehicle of the present invention offers many advantages over the prior art. By moving the engine rearwardly and by preferably moving the fuel tank forward and downwardly, there is provided a saddle-type vehicle having a open area that allows easier access to the vehicle. This also provides the user with the option of maximizing this area by adding an additional storage container, such as a additional fuel tank. The resulting vehicle also has a lower center of gravity.

The improved radiator location also reduces the probabilities of it being damaged while freeing an important amount of space in the front portion of the vehicle that may be used an additional larger storage area.

Other objects and features of the invention will become apparent by reference to the following specification and to the drawings.

BRIEF DESCRIPTION OF THE DRAWINGS

The following is a description by way of a preferred embodiment, reference being made to the following drawings, in which.

DESCRIPTION OF A PREFERRED EMBODIMENT

Figure 1:
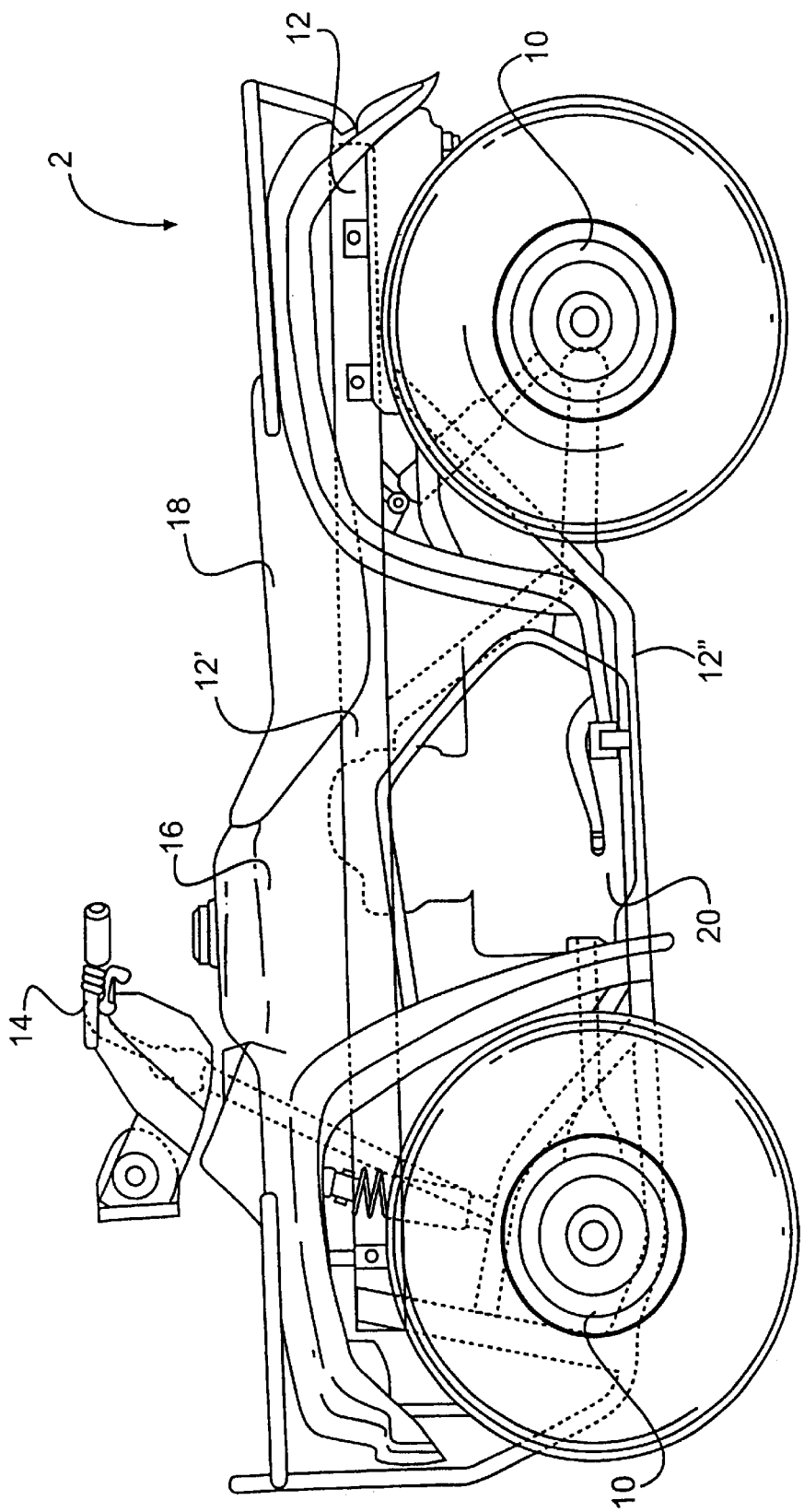
FIG. 1 is a side view of a saddle-type vehicle according to the prior art.

FIG. 1 illustrates a saddle-type vehicle 2 conventionally found in the prior art. Such a vehicle comprises four wheels 10 mounted to a frame 12, the front ones being steerable through a steering member 14 connected to a steering mechanism (not shown). The frame 12 comprises an upper member 12' extending on an upper portion of the vehicle above the power unit and a lower member 12" extending on a lower portion thereof. A fuel tank 16 and a seat 18 are disposed on an upper portion of the frame 12. The power unit 20, which represents one of the heaviest components of the vehicle, is typically mounted in a central portion of the vehicle, usually below the fuel tank 16 and a front portion of the seat 18. If the power unit is a water cooled engine, a radiator will be provided in front of the engine.

Figure 2:
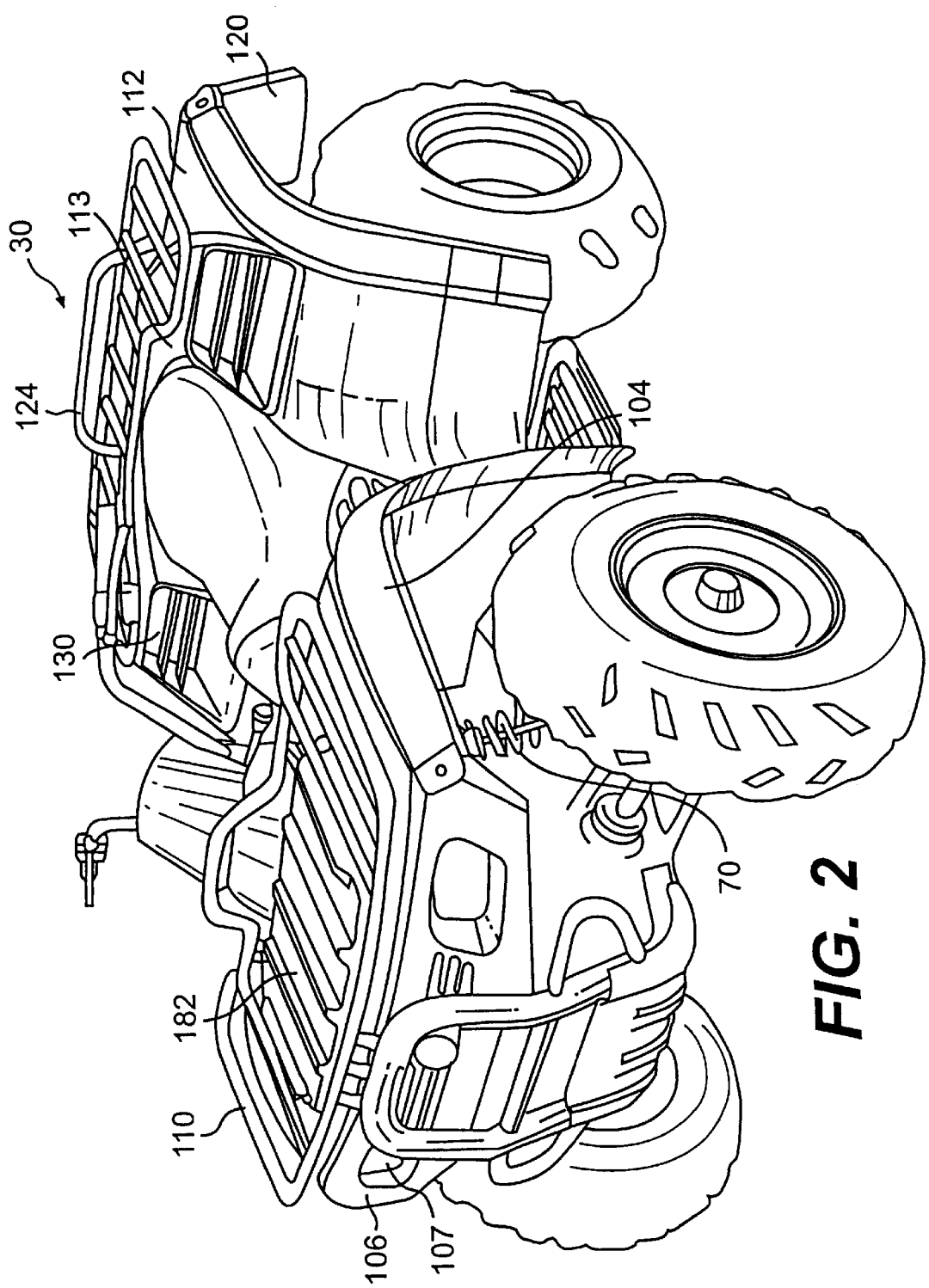
FIG. 2 is a perspective view of a saddle-type vehicle according to the present invention.
Figure 3:
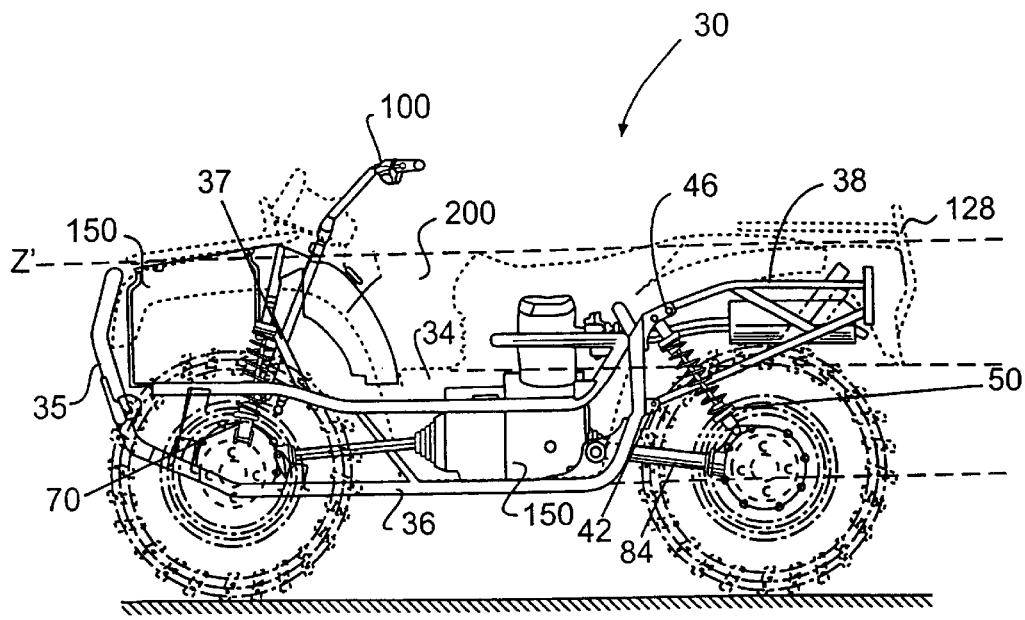
FIG. 3 is a side view of a vehicle according to the present invention illustrating more particularly the frame and the power transmission system.

A preferred embodiment of the saddle-type vehicle according to the present invention is generally illustrated in FIGS. 2 and 3.

Figure 4:
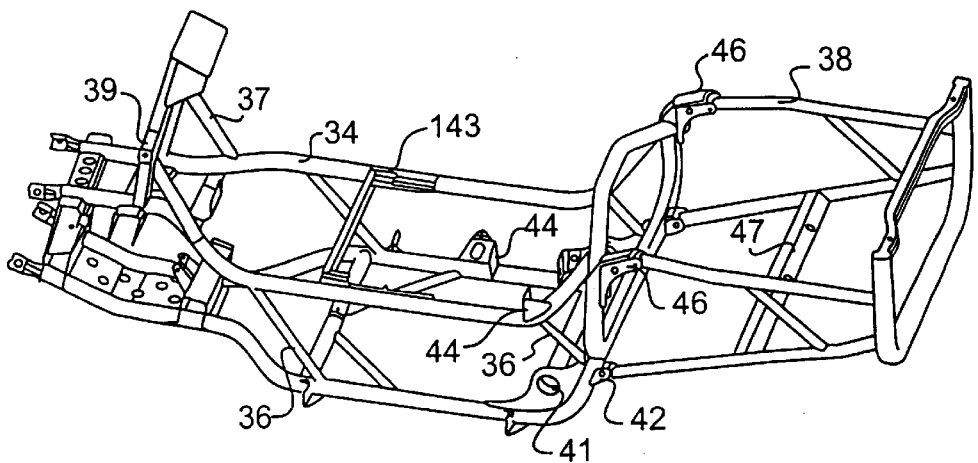
FIG. 4 is a perspective view of a frame.
Figure 4A:
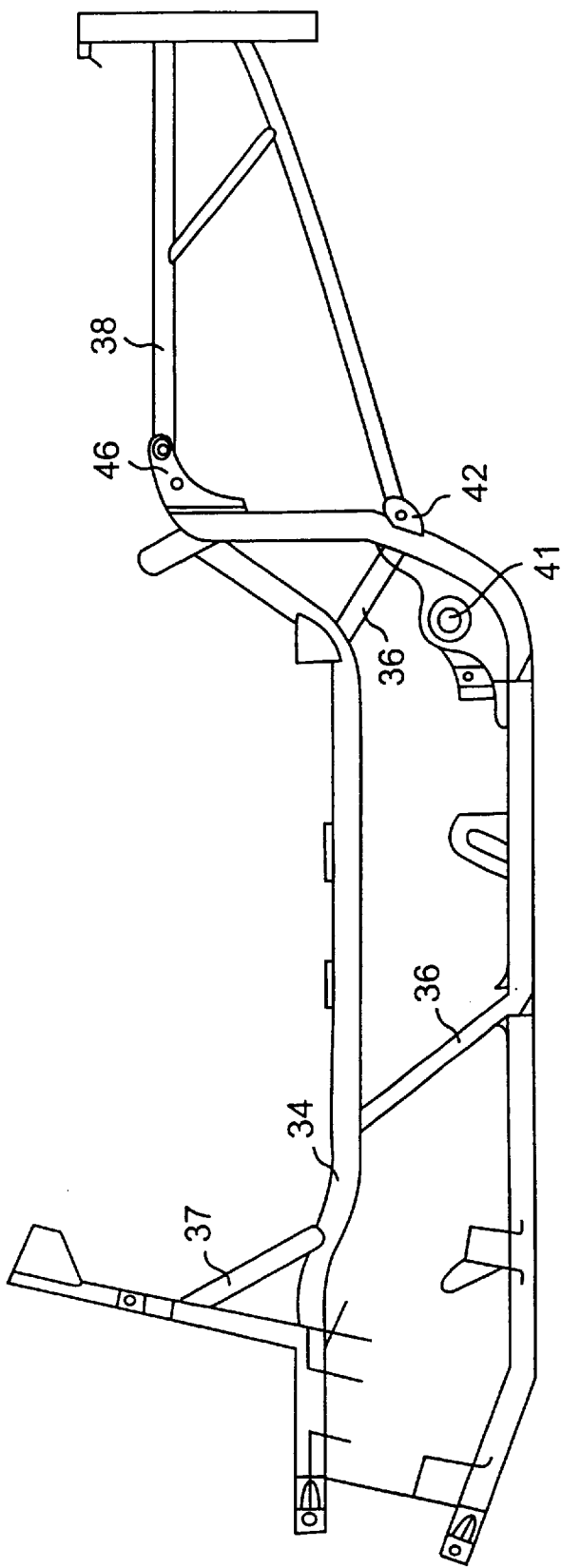
FIG. 4a is a side view of a frame.

Referring now to FIGS. 3 and 4, the vehicle, generally referred to at 30, comprises a main frame portion 34 and a secondary frame portion 38 that is attached to the main frame portion 34 at attachment points 42 and 46 which may consist of typical brackets. The front area of the main frame portion comprises all the attachments that are necessary to receive and accommodate the upper and lower front suspension arms, the front differential, steering linkage and other typical components including a front bumper 35. The rear area of the main frame portion extends upwardly and terminates by the two upper brackets 46 and the two lower brackets 42. The main frame portion also comprises openings 41 for pivotally attaching rear swing arms as described below and brackets 44 for mounting the power unit. The upper and lower brackets 46 and 42 are used to attach the secondary frame portion 38 to the main frame portion 34 as explained before. The upper brackets 46 are also used to receive and attach the upper end of the rear shock absorbers 50 to the main frame portion 34. Both the main and the secondary frame portions are of conventional construction and may be constructed from tubular or stamped members.

The provision of a main and of a secondary frame portions provide various advantages. First, the inventors have realized that it may be more efficient on an assembly line to manufacture a frame in two parts rather than as a single component when using conventional tooling. In contrast with the vehicles of the prior art, the main frame portion of the vehicle of the present invention does not comprise an upper member that is located above the power unit (referred to at 12' in FIG. 1) and that prevents the frame from bending. As a result, the main frame portion of the vehicle of the present invention must be capable of withstanding the same amount of stress that is imparted on a conventional frame. Typically, this will be achieved by manufacturing the main frame portion from a material having a higher creep resistence or by using larger members. Reinforcement members, such as 36 and 7 may also be provided to assist the main frame portion in maintaining its structural integrity. Since the main frame portion is intended to accommodate the majority of the stress imparted to the vehicle, the secondary frame portion may as a result be manufactured using a smaller structure or from a less expensive material. Apart from reducing costs, such an embodiment also has the advantage of providing a lighter vehicle. The person skilled in the art will however realize that this is only a preferred embodiment and that the objects of the present invention may be achieved using a unitary frame structure.

A pair of front wheels comprising a first wheel 58 and a second wheel 60 is suspended from the front area of the main frame portion. More particularly, the vehicle comprises upper suspension arms 64 (FIG. 5) and lower suspension arms (not shown) that are pivotally attached to the frame at one end and to a steering knuckle via ball joints at the other end. The steering knuckles each comprise a spindle adapted to receive a wheel and its bearings. The steering knuckles are connected to a steering member 100 through a conventional steering linkage or mechanism so as to provide steerable front wheels. A pair of front shock absorbers/coil springs assemblies 70 connected to the frame at bracket 39 at one end and to the upper suspension arms at the other end are also provided.

If the vehicle is intended to be of the four wheel drive type, power is transmitted from the power unit to the front wheels through a conventional mechanism comprising front axles 68 and a front differential 72 that is coupled to the power unit via a front driving shaft 76.

A pair of rear wheels comprising a third wheel 80 and a fourth wheel 82 is suspended from the rear area of the main frame portion. More particularly, the vehicle comprises rear swing arms 84 that are pivotally connected to the main frame portion at one end and to the rear axle casing 86 at the other end. A pair of rear shock absorbers/coil spring assemblies 50 connected to the main frame portion on one end and to the rear axle casing 86 on the other end are also provided. Alternatively, a single shock absorber/coil spring assembly could be used at the rear, provided it is located in a generally median location.

Power is transmitted from the power unit to the rear wheels through a conventional mechanism comprising a rear differential 90 that is coupled to a rear driving shaft 94 at one end and to a rear axle located in rear axle casing 86 at the other end. The rear driving shaft is located in a suitable housing. In a preferred embodiment, one of the rear swing arms 84 may serve as a housing for the rear driving shaft. In order to accommodate the angular movement of the rear swing arm, a universal joint is provided at a suitable location, preferably near the power unit.

While the preferred embodiment has been described using drive shafts to transmit power from the power unit to the front or rear pairs of wheels, other types of power transmission means may be provided. For example, the drive shafts could be replaced by suitable drive chain and sprocket arrangement.

Figure 14:
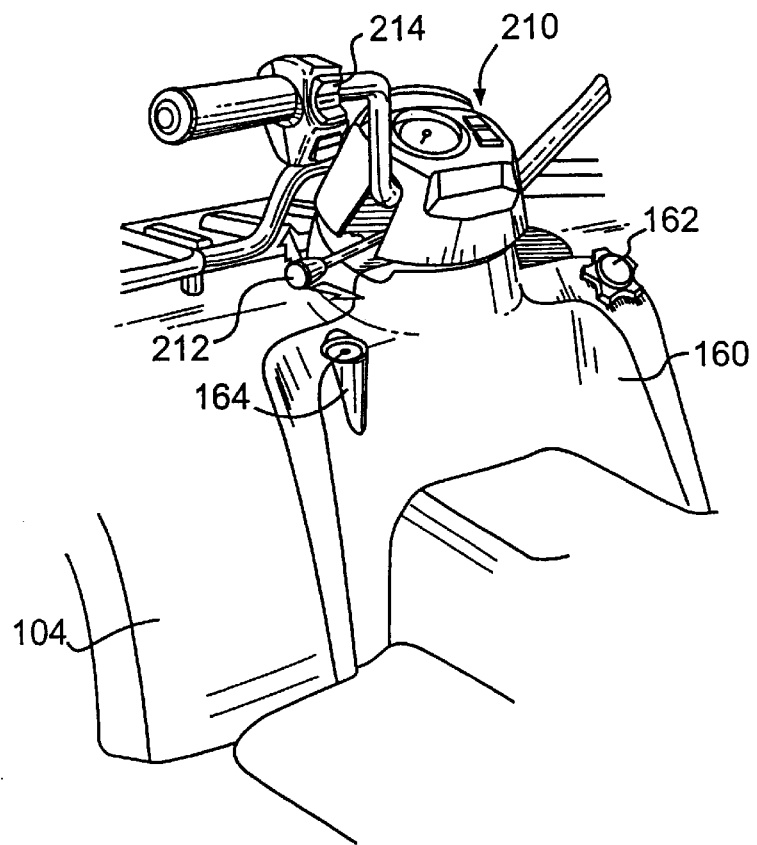
FIG. 14 is a perspective partial view of the steering member, instrumentation panel and fuel tank.

As shown more particularly in FIG. 14, an instrument board 210 is provided on the steering member 100 and comprises the usual indicators such as speedometer, odometer, indicator lights, etc. A device for electrically shifting gears 214 may also be provided if the vehicle is equipped with a semi-automatic transmission. A main gear lever 212, for selectively engaging either one of a Park, Neutral, High, Low or Reverse position is also conveniently located near the steering linkage.

The vehicle is also provided with a conventional braking mechanism which may comprise disk or drum brakes. The brakes may be hydraulically or mechanically activated.

Figure 6:
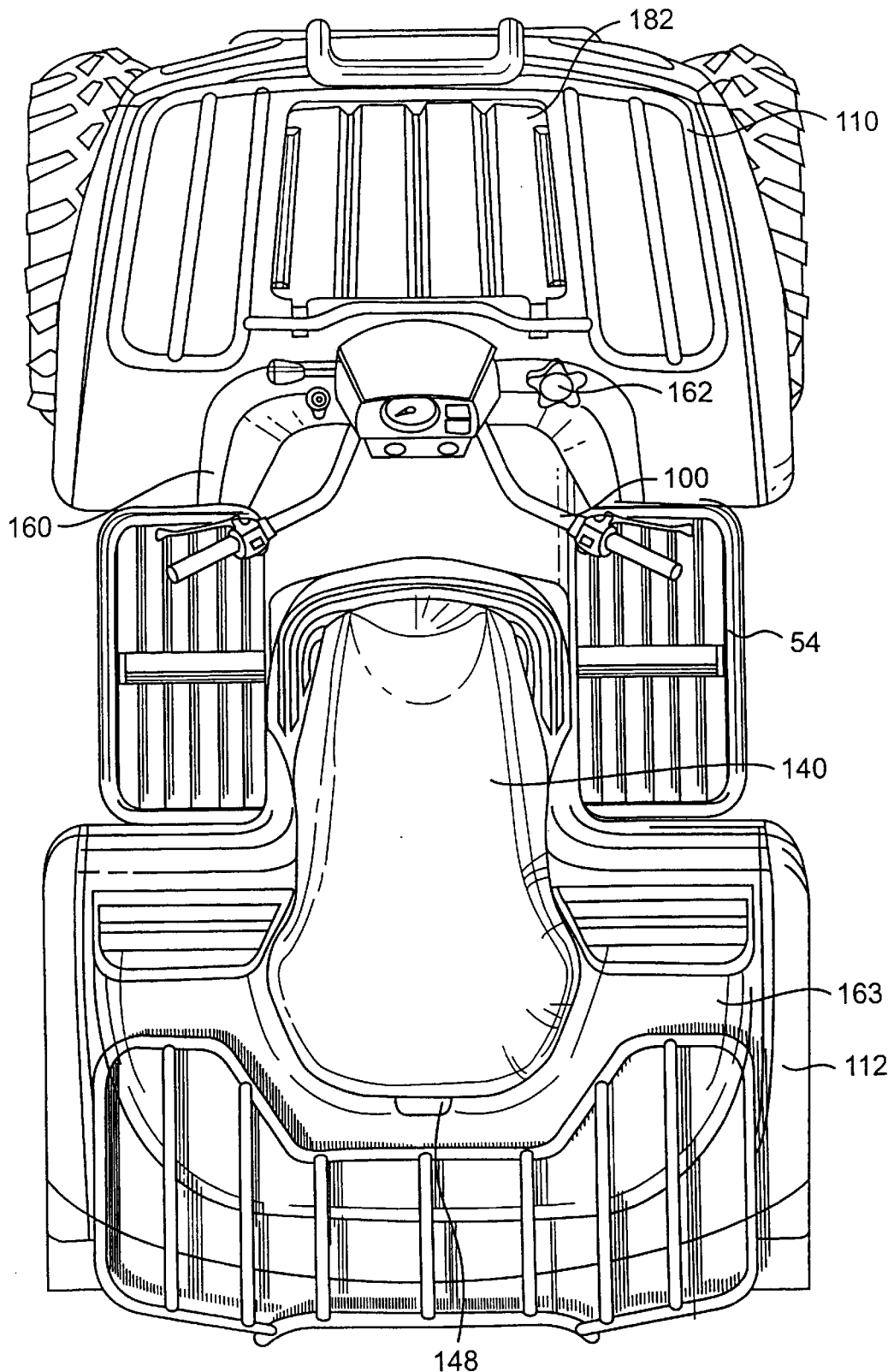
FIG. 6 is a top plan view of a vehicle according to the present invention.
Figure 7:
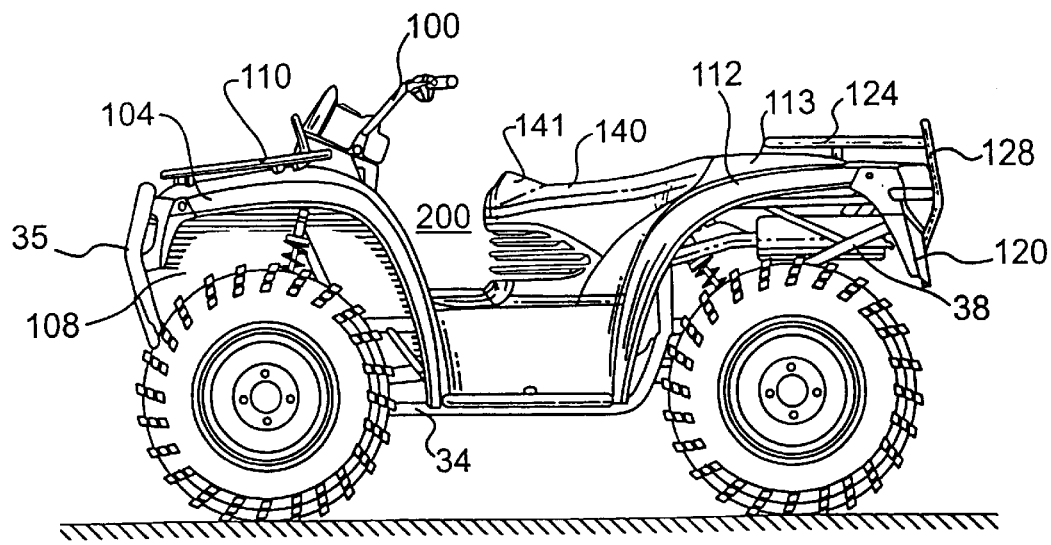
FIG. 7 is a side view of the vehicle illustrated in FIG. 2.
Figure 10:
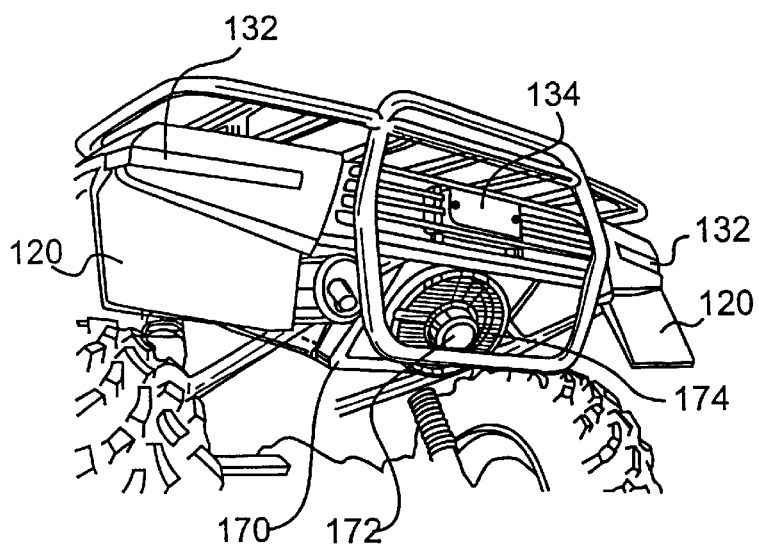
FIG. 10 is a perspective view of a rear portion of a vehicle according to the present invention illustrating the position of the radiator.

As shown more particularly in FIGS. 2, 6 and 7, the vehicle also comprises front fenders 104 attached to the frame and defining front wheelhouses 108. The front portion of the vehicle also includes a front grille 106 and headlamps 107 and may comprise a front rack 110. A front storage compartment 180 (FIG. 3) is also provided at the front portion of the vehicle, in front of the steering member 100. Rear fenders 112 are also attached to the frame. The rear fenders may also comprise splash guards 120 and a rear rack 124. As shown more particularly in FIG. 10, the rear portion of the vehicle may also comprise reflective tapes 132 and a rear lamp 134. The rear fenders also comprise ventilation openings 130 (FIGS. 11 and 12), the purpose of which will be described hereinafter. Front and rear bumpers 35 and 128 are also respectively secured to the main and secondary frame portions 34 and 38.

Full foot rests 54 are also provided on each sides of the vehicle, in between the front and rear fenders. The foot rests 54 may accommodate a gear shift lever (if the vehicle does not have a semi-automatic transmission) and brake lever (not shown). The provision of full foot rests provides increased comfort in contrast with the typical foot peg since the weight is distributed over the entire bottom surface of the foot.

A saddle-type seat 140 is also removably secured to the frame using generally U-shaped brackets 142 (FIGS. 8 and 9) or 143 (FIG. 4) that are securely fixed to the frame. As shown in FIG. 9, the seat comprises a base portion 146 made from a suitable material such as plastic. The base portion 146 is shaped so as to surround and enclose the power unit thereby enhancing the aesthetics of the vehicle when the seat is in a closed position as shown in FIG. 7. The upper portion of the seat is provided with a suitable padding material and a pommel 141 is disposed at a front portion thereof to improve comfort. A support member 144 is secured to the base 146 and is adapted to engage bracket 142 or 143 to secure the seat in place. A locking device 148 maintains the seat in a closed position wherein the driver may drive the vehicle.

Figure 8:
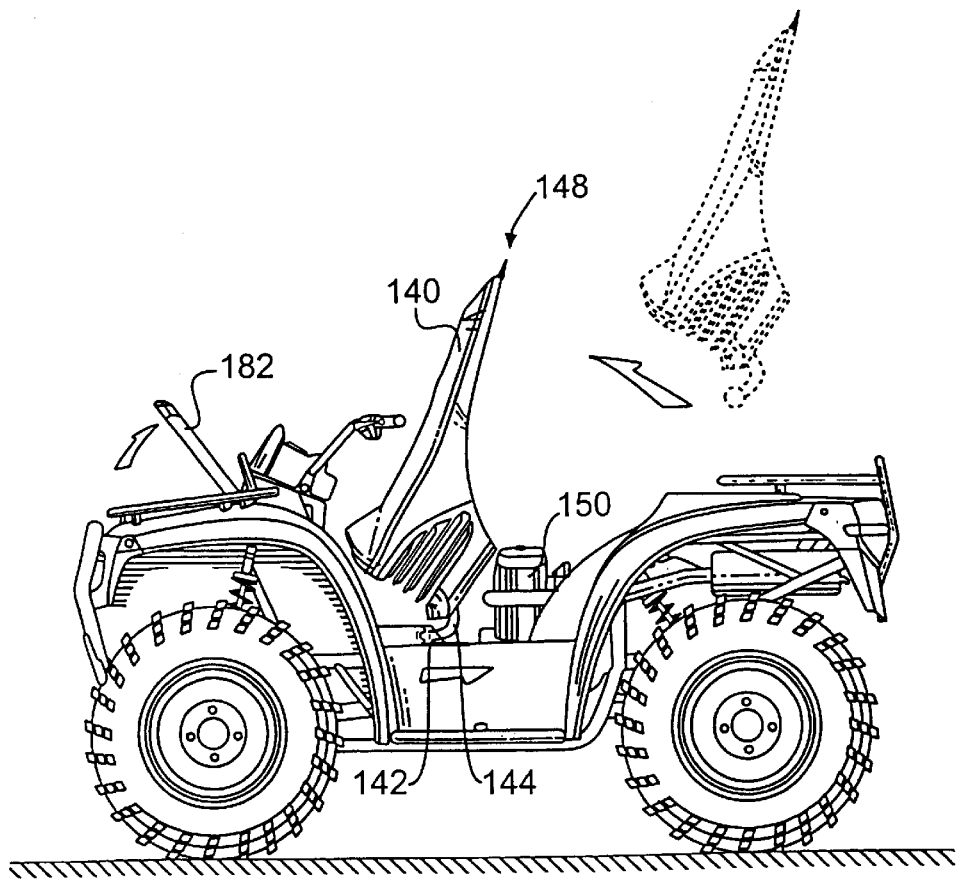
FIG. 8 is a side view illustrating the front hatch in an open position and the seat in an engine access position.
Figure 9:
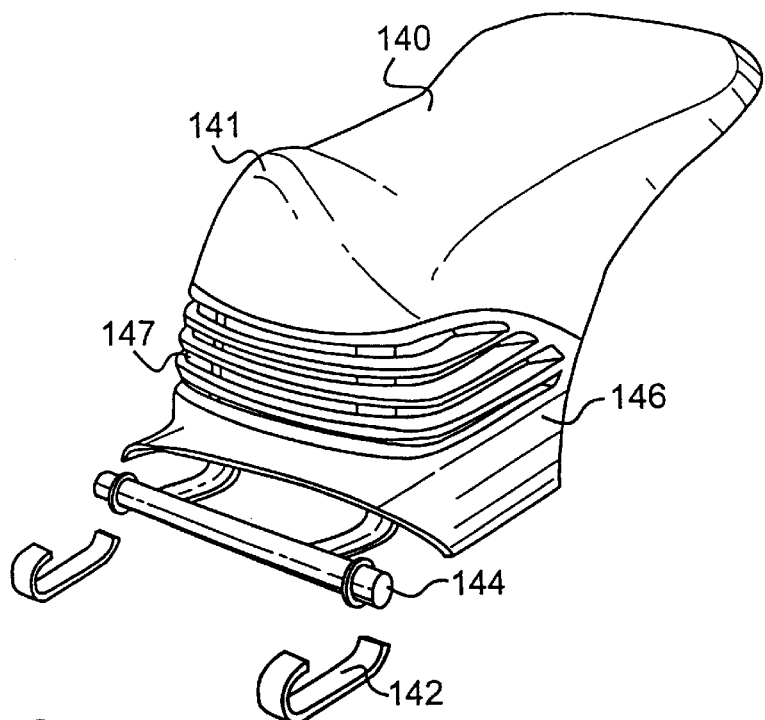
FIG. 9 is a perspective view of a seat and mounting brackets thereof.

As shown in FIG. 8, the engine compartment of the vehicle is readily accessible by simply pivoting and/or removing the seat. In order to remove the seat, the user unlocks the locking device 148, pivots the seat upwardly and thereafter slides the seat rearwardly until the support member 144 clears the upper portions of the brackets 142 or 143.

Figure 16:
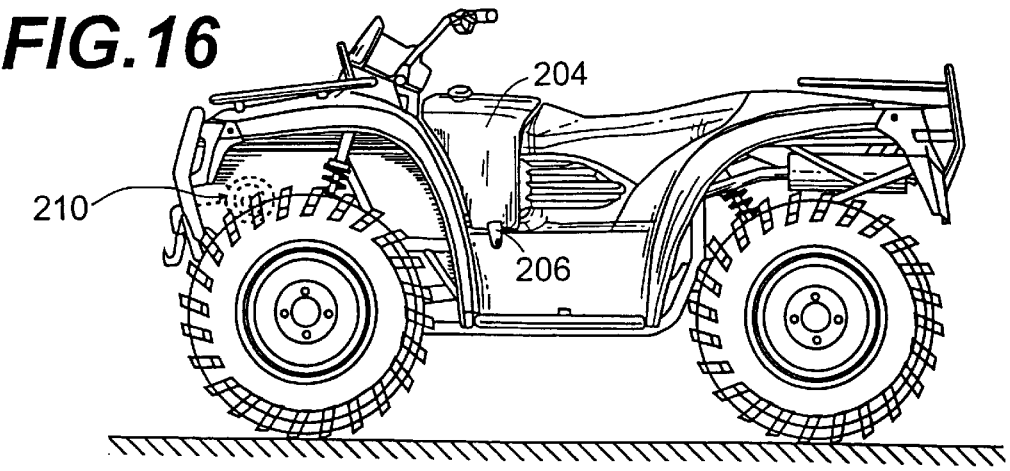
FIGS. 16 and 17 are side views of a vehicle according to the present invention comprising an additional container.
Figure 17:
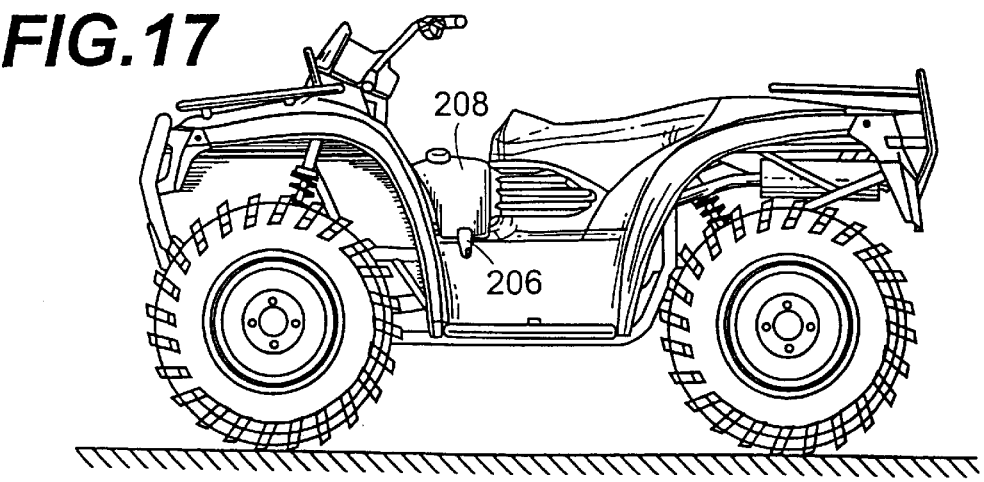

Since the power unit is enclosed beneath the seat 140, ventilation openings 147 are preferably provided in the base portion 146 of the seat in order to ensure proper ventilation of the engine compartment. The ventilation openings 147 preferably also extend to the side of the seat since accessories, which would block the openings, may be provided in front of the base portion of the seat as shown in FIGS. 16 and 17.

Figure 5:
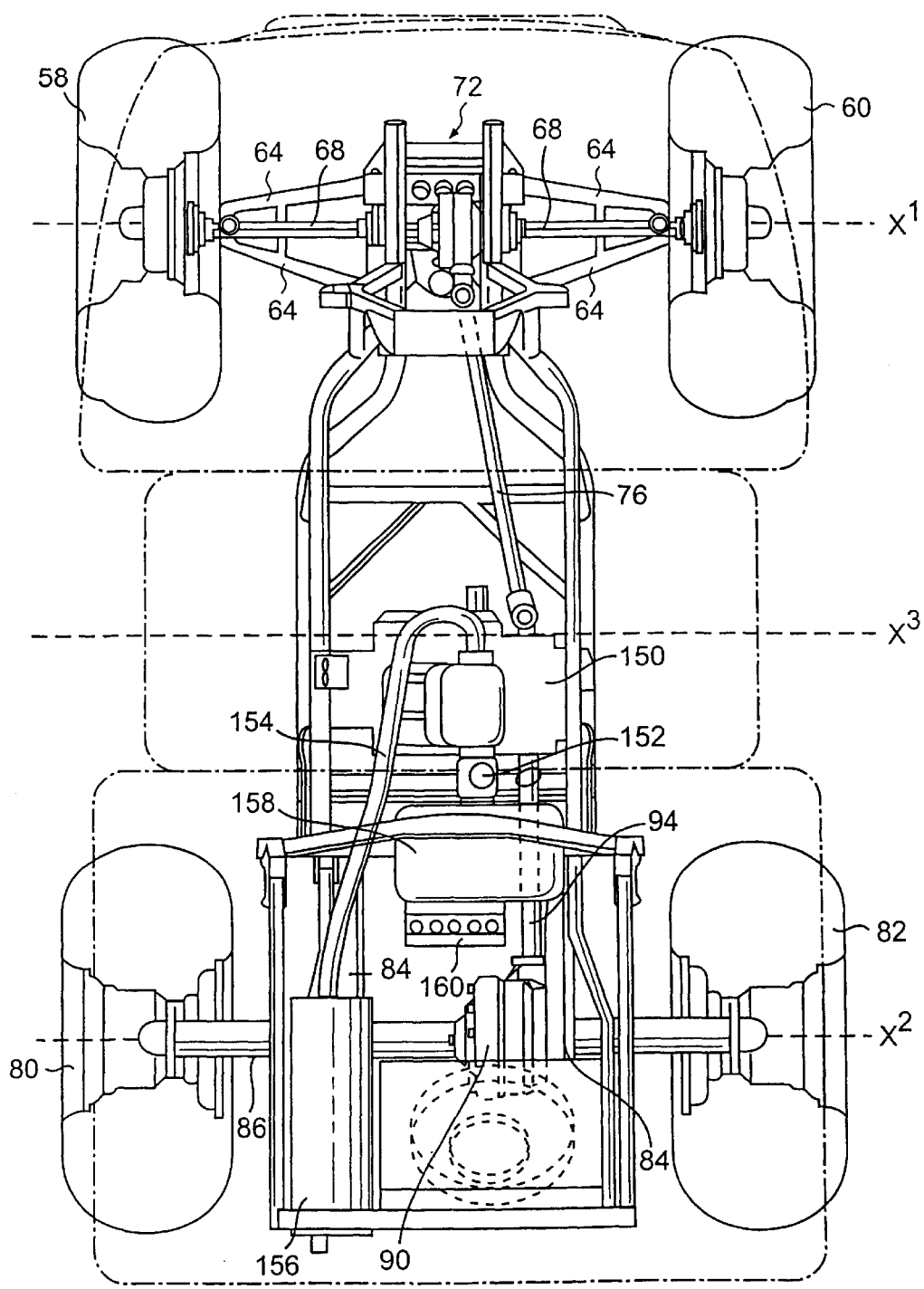
FIG. 5 is a top plan view of a vehicle according to the present invention illustrating more particularly the frame and the power transmission system.

A suitable type of power unit for use in the context of the present invention is preferably capable of simultaneously driving the front and rear wheels, although rear or front wheel drive vehicles may also be contemplated. A preferred type of power unit includes an engine and a transmission integrally joined to one another. The crankshaft, main and secondary shafts and output or transmission shaft all extend in the same direction which preferably corresponds to the longitudinal direction of the vehicle. In a preferred embodiment, the transmission shaft is connected to the rear driving shaft 94 at one end and, if the vehicle is of the four wheel drive type, is also connected to the front driving shaft 76 at the other end. The power unit comprises all the necessary components such as a carburetor 152, an exhaust pipe 154, a muffler 156, an air filter 158 having an air intake, and a battery 161 (FIG. 5).

The basic internal construction of the power unit will not be described in details as it will be readily apparent to the person skilled in the art that the invention may be practiced with any suitable types of power units.

In contrast with the prior art, where the power unit is mounted in a central portion of the vehicle, the power unit of the vehicle of the present invention is mounted more towards the rear portion of the vehicle.

In a first preferred embodiment, the position of the power unit may be defined in relation to various transversal axis. More specifically, the location of the power unit 150 may be defined in relation to an imaginary axis $x^3$ that is located at a median point between a first transversal axis $x^1$ defined by the front wheels 58 and 60 and a second transversal axis $x^2$ defined by the rear wheels 80 and 82. More particularly, in this embodiment, a main portion of the power unit is located in between the median axis $x^3$ and the second axis $x^2$.

If, in another embodiment, the vehicle is provided with two pairs of rear wheels, for a total of six wheels, the second axis $x^2$ will defined by the two foremost rear wheels.

In another embodiment, the location of the power unit may be defined in relation to the seat. Thus, as shown in FIGS. 3 and 8 and in contrast with the prior art, the present invention may be characterized by a vehicle in which a main portion of the power unit 150 is disposed beneath the seat 140.

Another aspect of the invention resides in the location of the fuel tank 160. Since a full fuel tank represents a relatively heavy component of the vehicle, its location is important to ensure proper weight distribution and proper balance of the vehicle. As shown in FIGS. 3, 6 and 14, in one embodiment, the fuel tank, that comprises a fuel cap 162 and a fuel gage 164, extends vertically beneath the steering member 100 and more particularly, substantially below the horizontal plane z' defined by the uppermost portion of the seat 140.

The location of the fuel tank at this specific area provides many benefits. First, by providing a tank that extends in the vertical direction, it is possible to concentrate an important amount of weight in the lower portion of the vehicle thereby lowering its center of gravity.

By moving the fuel tank 160 from an upper portion of the frame to an area located generally beneath the steering member 100, there is provided an open area 200, between the fuel tank 160 and the power unit 150. This open area 200 facilitates access to and from the vehicle as the driver does not have to raise his leg above the level of the fuel tank, seat or rear portion of the vehicle. The open area also provides space to secure additional storage containers.

The person skilled in the art will realize that some objects of the present invention may be achieved by locating the fuel tank at an area other than beneath the steering member 100. For example, the fuel tank could be located at a front portion of the vehicle, and could surround the steering linkage. The location of the fuel tank will therefore be dictated by balance and security considerations.

If the power unit is a water-cooled engine, the vehicle may comprise a radiator 170. In the preferred embodiment, the radiator is located behind the engine at the rear area of the secondary frame portion. The radiator may be fixed to the frame by securing it to bracket 47 (FIG. 4). As shown more particularly in FIG. 10, the radiator is preferably inclined forward and upwardly towards the seat of the vehicle and comprises a grille (not shown) and a schroud 174 protecting the grille. A cooling fan 172 is mounted within the shroud in a conventional manner.

The provision of a radiator at the rear portion provides increased protection by limiting its exposure. Since, during normal operation, the vehicle travels mostly in the forward direction, the possibilities of the rearwardly located radiator being pierced by a branch or the like are therefore substantially reduced. The location of the radiator at the rear portion of the vehicle also permits to make a more efficient use of the space in the front portion thereof and provides room to more efficiently locate the fuel tank as explained above.

Figure 11:
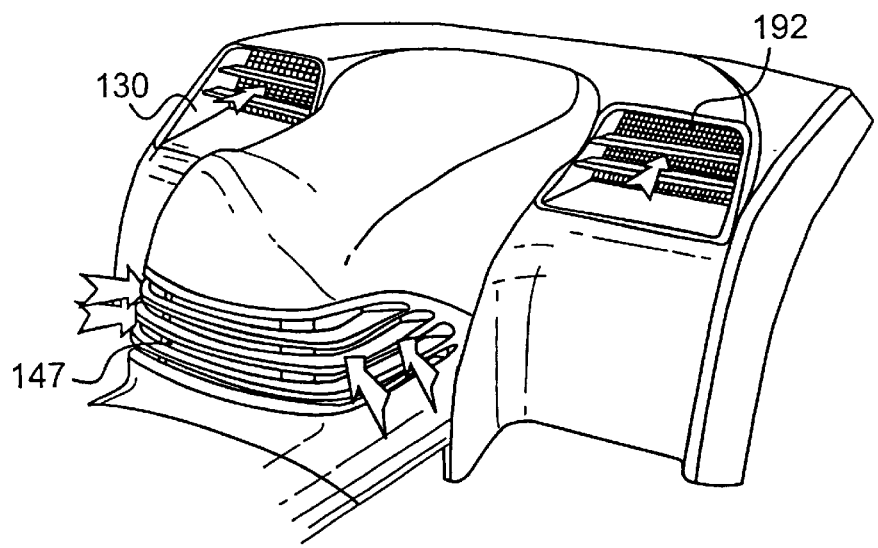
FIG. 11 is a perspective view of a portion of a seat and rear fenders illustrating the ventilation openings.
Figure 12:
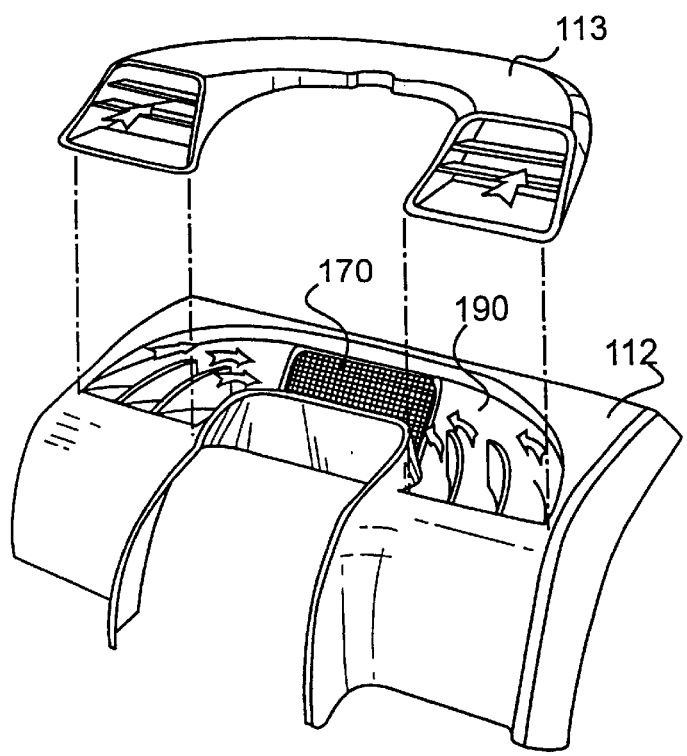
FIG. 12 is an exploded view of the rear fenders and ventilation channels cover.
Figure 13:
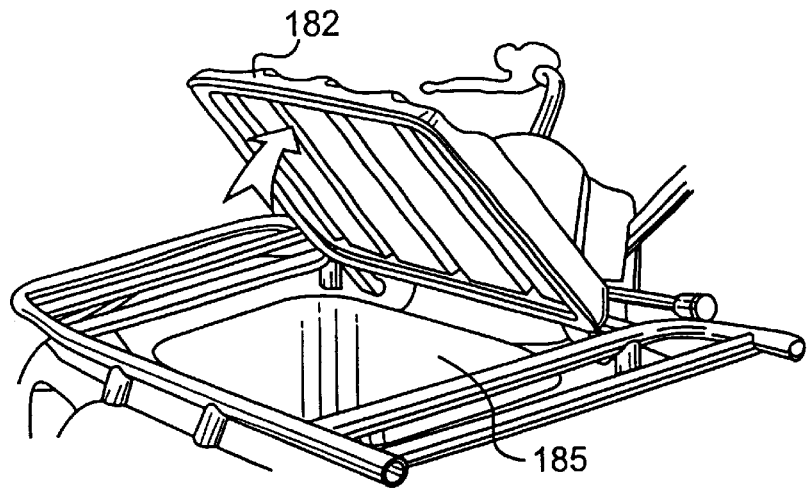
FIG. 13 is a perspective view of a front storage compartment with the hatch in an open position.

Referring now to FIGS. 11 and 12, there are provided forward facing ventilation openings 130 for conveying air to the radiator 170. In order to convey the cooling air, ventilating channels 190 are defined within the rear fenders 112 as shown more particularly in FIG. 12. A cover portion 113 covers the channel and protecting grilles 192 are provided to prevent debris from entering and blocking the ventilating channels.

By locating the radiator at a rear portion of the vehicle, the inventors were also capable of maximizing the amount of space at the front of the vehicle. By providing a rear radiator, the inventors were capable of providing a front storage compartment 180 at a front portion of the vehicle, forward of the steering member (FIG. 3). The storage compartment comprises a hatch 184 that is pivotally secured to the vehicle and that is preferably removable. The front storage compartment may be provided with a waterproof removable container 185 that may be used as a cooler or that may be used as a tank to keep the catch of the day if the user is an avid fisherman as an example. Absent such front storage compartment, the driver would have to secure any objects to the front or rear racks 110 or 124 by using ropes or the like. This is time consuming.

Figure 15:
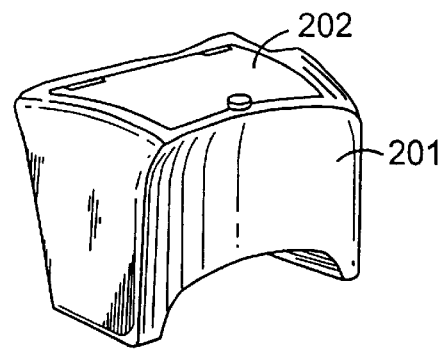
FIG. 15 is a perspective view of an additional storage container.

A plurality of additional storage containers or accessories adapted to be inserted into the open area 200 may be provided. An example of an additional storage container is illustrated in FIG. 15 and comprises a container portion 201 and a hatch 202. FIG. 16 illustrates the possibility of providing an additional fuel tank 204 that is secured to the vehicle via mounting brackets 206. Evidently, this type of additional fuel tank will have to respect all applicable security and liability requirements before being installed on the vehicle. Another possible embodiment concerning a smaller tank 208 is shown in FIG. 17.

Other types of accessories, such as a winch 210, may also be provided, preferably within the front portion of the vehicle underneath the storage compartment 180.

The above description of a preferred embodiment should not be interpreted in any limiting manner since variations and refinements are possible which are within the spirit and scope of the present invention. The scope of the invention is defined in the appended claims and their equivalents.

The embodiments of the invention for which an exclusive property or privilege is claimed are defined as follows:

1. An all terrain vehicle comprising a frame, a pair of all terrain front wheels suspended from a front suspension connected to said frame, a pair of all terrain rear wheels suspended from a rear suspension connected to said frame, a pair of front fenders positioned above the pair of all terrain front wheels, a power unit mounted on said frame, a transmission allowing said power unit to transmit power to at least one of said front and rear pairs of wheels, a straddle seat located in between a first transversal axis defined by the pair of all terrain front wheels and a second transversal axis defined by the pair of all terrain rear wheels, said straddle seat having a forwardly facing portion including an exposed, substantially vertical portion and defining in part an open step through area extending below an uppermost portion of the pair of front fenders and forward of the straddle seat, to provide access to and from the vehicle, wherein a main portion of said power unit is disposed beneath said straddle seat.

2. The vehicle of claim 1, wherein a main portion of said transmission is disposed beneath said straddle seat.

3. The vehicle of claim 1, wherein said power unit comprises a crankshaft and a transmission shaft extending in a running direction of said vehicle, and wherein a rear drive shaft is connected to a rear end of said transmission shaft on one end and to a rear differential on the other end to allow said power unit to transmit power to said pair of all terrain rear wheels.

4. The vehicle of claim 1, further comprising a front drive shaft connected to a front end of said transmission shaft on one end and to a front differential on the other end to allow said power unit to transmit power to said pair of all terrain front wheels.

5. The vehicle of claim 1, wherein said straddle seat comprises a pommel located at a front portion thereof.

6. The vehicle of claim 1, wherein said power is transmitted to either one of said front and rear pairs of wheels through a drive chain and sprocket arrangement.

7. The vehicle of claim 1, wherein said straddle seat is pivotably connected to said frame, said straddle seat being moveable between a first position whereby the driver may drive the vehicle and a second position whereby the driver may access the power unit.

8. The vehicle of claim 1, wherein said straddle seat is removably connected to the frame.

9. The vehicle of claim 1, wherein the open step through area is fixed with respect to at least one of the front fenders and the power unit.

* * * * *